May 3, 1938.                    W. L. LOMAX                    2,115,730
                          PROCESS OF TREATING EGGS
                           Filed Oct. 31, 1936            2 Sheets-Sheet 1
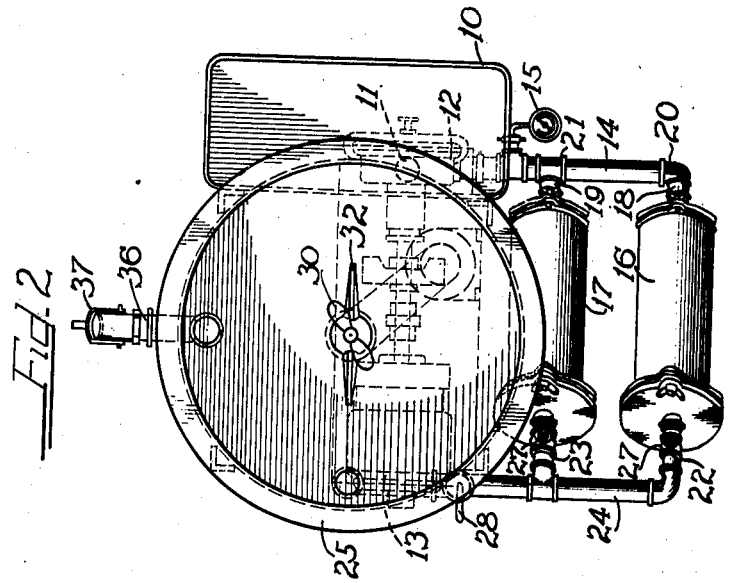
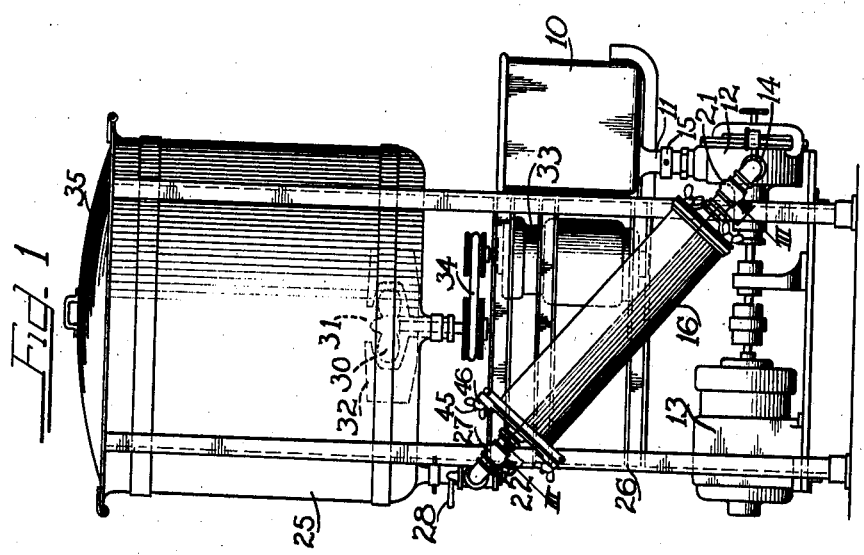
Inventor
WILLIAM L. LOMAX, DEC.
FRANK B. LOMAX, ADM.

May 3, 1938.  W. L. LOMAX  2,115,730
PROCESS OF TREATING EGGS
Filed Oct. 31, 1936  2 Sheets-Sheet 2
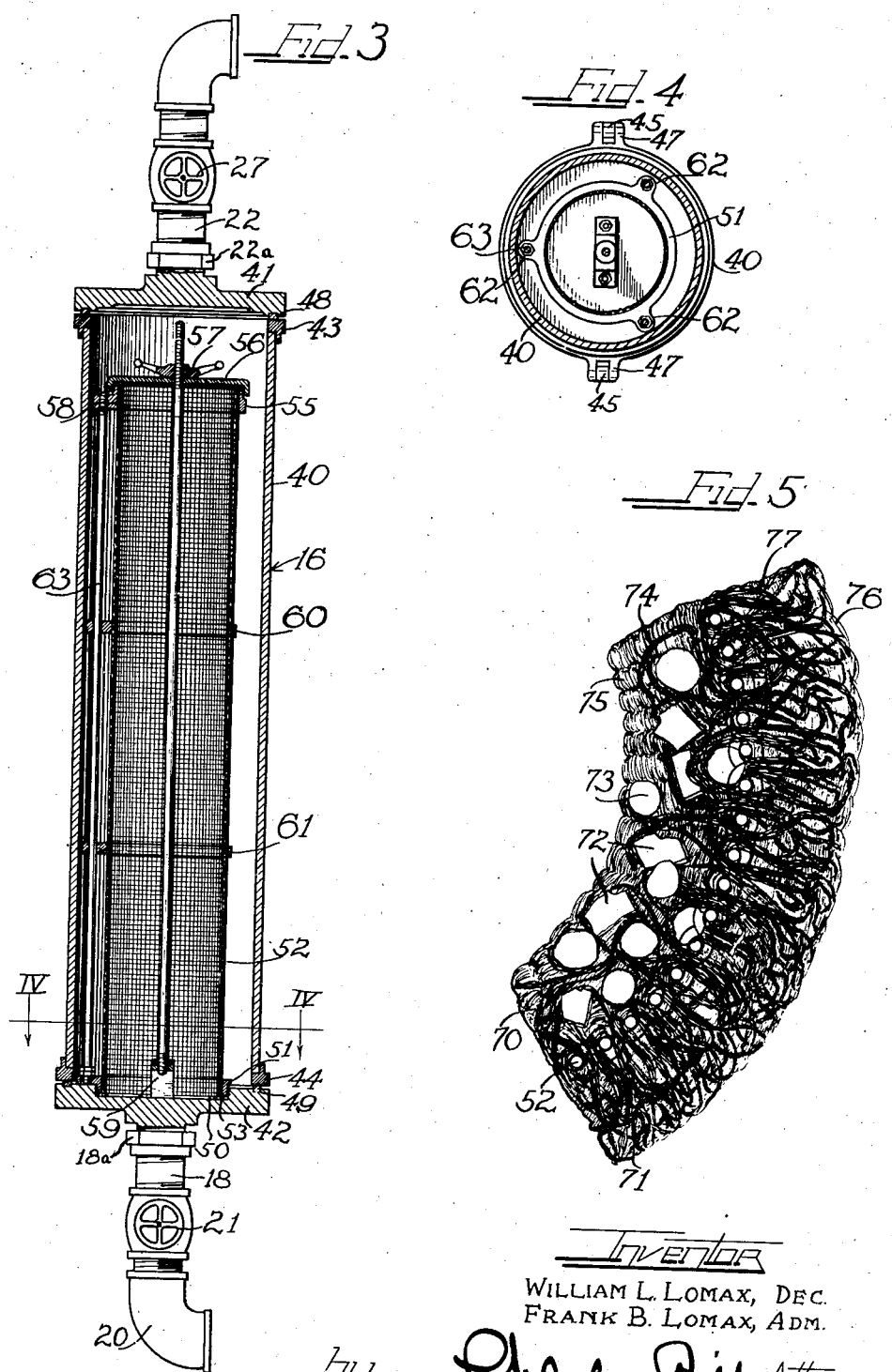
Inventor
WILLIAM L. LOMAX, DEC.
FRANK B. LOMAX, ADM.

Patented May 3, 1938

2,115,730

UNITED STATES PATENT OFFICE 2,115,730

PROCESS OF TREATING EGGS

William L. Lomax, deceased, late of Chicago, Ill., by Frank B. Lomax, administrator, Chicago, Ill.

Application October 31, 1936, Serial No. 108,510

10 Claims. (Cl. 99—113)

This invention relates to process and apparatus for treating "broken" egg material to render the same suitable for canning or freezing.

More specifically this invention relates to a continuous process and apparatus for filtering and treating egg meats to render the same homogeneous and suitable for canning or freezing.

This application is a continuation-in-part of William L. Lomax application Serial No. 711,002 filed February 13, 1934.

According to this invention whole eggs, including the white and the yoke in the proportions found in the natural state, or the yokes of the eggs alone, or the whites of the eggs alone, are treated to remove undesirable constituents therefrom and to render a homogeneous mass of the desired egg meats suitable for immediate canning.

Broken egg material contains shell fragments, lumpy particles which will not break down or disintegrate with ordinary agitation or mixing, membraneous material such as chalaza, blood spots, dirt and other extraneous material which should be eliminated or disintegrated prior to the canning of the egg meats.

One of the desirable features of canned egg meats which the baker, confectioner, ice cream manufacturer or other user seeks is evenness of texture and a quality of ready admixture on stirring with other ingredients. The process of this invention makes possible the elimination of all the foregoing undesirable elements from the egg meats or a disintegration of some of these elements to produce a product which is wholly satisfactory to the user.

In the treatment of egg material to remove the undesirable constituents thereof a filtration operation has been utilized in which the egg material is forced through a foraminous or porous filter member under pressure. However the filter member rapidly becomes clogged and it is frequently necessary to stop the process for a disassembly of the filter apparatus to permit the cleaning of the filter member. These frequent but necessary cleaning operations are very undesirable in commercial production since the capacity of a given apparatus is greatly limited and the production process materially slowed down.

According to this invention a continuous process is made possible by the use of a plurality of filter devices capable of being thrown into and out of operation without stopping the process. Thus according to this process a filter unit is used until the same is clogged by the egg material being supplied thereto and the filter bed built up by the unfiltered material. The clogged filter is then thrown out of operation by merely turning a valve and a clean filter is brought into operation. During the period that the new filter is being used the clogged filter can be disassembled for cleaning. In this manner egg material is constantly being filtered in a single apparatus and the heretofore necessary shut downs are avoided.

The process provides for the forcible flowing of egg material under pressure along an upwardly inclined passage having foraminations therein of a size permitting the passage of desirable egg material but preventing the passage of undesirable constituents. The material passing through the foraminations flows upwardly along the inclined passage into a mixing chamber maintained above the filter. The filtered egg material is mixed to a uniform mass in the mixing chamber. A back pressure is thus obtained on the filter member by a head of filtered egg material. This back pressure or head of filtered egg material prevents foaming of the egg material, since it provides for the discharge of the filtered egg meats from the filter screen into a fluid mass of the filtered material. Foaming of a liquid is always lessened or prevented when the liquid is poured into a liquid containing vessel from beneath the surface of the liquid in that vessel.

It is then an object of this invention to provide a continuous process for treating egg material to eliminate undesirable ingredients therefrom, to disintegrate large sized particles, membraneous material and the like and to uniformly mix the egg material to produce a product of uniform texture.

Another object of this invention is to provide a continuous process of filtering eggs under pressure.

A further object of this invention is to provide a plurality of inclined foraminous passages for egg material and to force egg material under pressure through one of said passages until the same becomes clogged and then divert the egg material into another of said passages.

Still another object is to provide a continuous process of filtering eggs with a minimum amount of foaming of the egg material.

A specific object of this invention is to force unfiltered broken egg material upwardly through an inclined foraminous passage adapted to withhold undesirable ingredients in the egg material thereon while maintaining a head of filtered egg material against the other side of said inclined foraminous passage to prevent foaming of the egg material.

Other and further objects of this invention will become apparent to those skilled in the art from the following detailed description of the annexed sheets of drawings which disclose preferred embodiments of apparatus useful for carrying out the process of the invention.

On the drawings:

Figure 1 is a side elevational view of apparatus for carrying out the process of this invention.

Figure 2 is a plan view of the apparatus shown in Figure 1.

Figure 3 is a vertical longitudinal enlarged cross-sectional view taken substantially along the line III—III of Figure 1, with parts shown in elevation.

Figure 4 is a transverse cross-sectional view taken substantially along the line IV—IV of Figure 3.

Figure 5 is a greatly enlarged cross-sectional view taken through the filter screen of the filter device shown in Figure 3 and illustrating the manner in which a filter bed of egg material is built up on the inside of the screen with portions of egg material passed through the screen but adhering thereto.

As shown on the drawings:

In Figures 1 and 2 the reference numeral 10 indicates a hopper for receiving the untreated broken egg material. A drain conduit 11 communicates with the bottom of the hopper 10 for feeding the egg material into a gear pump 12 driven by an electric motor 13. The gear pump 12 pumps the egg material under superatmospheric pressure into a conduit 14. A pressure gauge 15 can be provided on the conduit 14 to indicate the pressure of the egg material being forced through the conduit.

Filter units 16 and 17 communicate with the conduit 14 through branch pipes 18 and 19 threaded into an elbow 20 and a T-coupling 21 secured on the conduit 14. The branch pipes 18 and 19 have valves 21 therein whereby the egg material flowing through the conduit 14 can be directed into either of the filter units 16 and 17 by manual control of the valves 21.

As best shown in Figure 1 the filter units 16 and 17 slope upwardly from the conduit 14 and have discharge pipes 22 and 23 at the upper ends thereof communicating with a discharge conduit 24. The discharge conduit 24 communicates with the bottom of a receiving tank 25 mounted above the filter units on a frame structure 26.

The discharge pipes 22 and 23 from the filter units 16 and 17 have valves 27 therein adapted to be opened when a filter 16 or 17 is operated. Likewise the discharge conduit 24 has a core valve 28 therein controlling the flow of egg material into the tank 25.

The filtered egg material enters into the tank 25 at the bottom thereof and is agitated and mixed by a stirring paddle or propeller 30 rotatably mounted within a central opening 31 of a baffle plate 32. The paddle 30 can be conveniently driven by an electric motor 33 secured to the frame structure 26 below the tank 25, as indicated in Figure 1, through a pulley and belt connection 34. In this manner the filtered egg material having all of the undesirable ingredients removed therefrom and being disintegrated to a desired degree by passing through the filter is mixed by the paddle into a homogeneous mass in the tank 25. The tank 25 can be closed by a cover 35.

When the egg material is thoroughly mixed the same can be drained from the tank 25 through a drain pipe 36 having a valve 37 therein as indicated in Figure 2.

As shown in Figures 3 and 4, the filter unit 16 comprises a cylindrical housing member 40 having open ends closed by cap members 41 and 42 respectively and secured to flanges 43 and 44 on the ends of the housing by means of bolts 45 and wing nuts 46 as indicated in Figures 1 and 4. The bolts 45 can be pivotally mounted in ears 47 (Figure 4) formed on the end flanges 43 and 44. Gaskets 48 and 49 (Figure 3) are interposed between the caps and the flanges so that when the wing nuts 45 are tightened, the gaskets will be compressed and form an airtight seal between the cylindrical housing and the end caps. The end caps have the pipes 18 and 22 connected therewith through unions or couplings 18a and 22a respectively. These pipes 18 and 22 have the valves 21 and 27 therein controlling the flow of egg material to and from the filter member.

The end cap 42 has a recessed central portion 50 for receiving in threaded relation thereto a ring member 51 having a cylindrical screen 52 brazed or soldered to its inner periphery. The flange or collar 51 is threaded down into the portion 50 of the cap 42 against a gasket 53 to provide a seal so that all material passing into the portion 50 of the end cap 42 will be directed into the screen 52.

The screen 52 has a second collar 55 secured at the other end thereof by brazing, soldering or the like. The collar 55 receives therearound a closure cap 56 to close the end of the filter. The cap 56 can be held tightly on the collar 55 by a wing nut 57 threaded around an elongated rod 58 extending axially down through the center of the screen 52 and threaded at its other end in a strap member 59 mounted in the portion 50 of the end cap 42.

Intermediate collars such as 60 and 61 are secured around the screen 52 intermediate the ends thereof. The collars 51, 55, 60 and 61 have ears such as 62 (Figure 4) formed around their outer peripheries for receiving therethrough rods 63 to support the screen and render the same rigid. The rods 63 can be threaded into the end collars 51 as indicated in Figure 3.

The filter unit 17 is of similar construction.

The process of this invention is carried out on an apparatus such as described in Figures 1 to 4 by breaking the eggs at a breaking table in manners conventional in the industry and introducing either the whole eggs or the whites of eggs or the yolks of eggs into the hopper 10 from which the material is discharged downwardly through the conduit 11 into the gear pump 12 and from the gear pump 12 into a second conduit 14 of relatively small cross section. The gear pump is of conventional construction and adapted to force the egg material through the conduit 14 under superatmospheric pressure without incorporating air therein. From the conduit 14 the egg material is directed at will through either of the branch pipes 18 or 19 into either of the filters 16 or 17. The diameter of the filter casing 40 is much greater than the size of the conduit 14. The filter members 16 and 17 slope upwardly from the pipes 18 and 19 and the filter screens 52 mounted in each of the filters likewise slope upwardly.

When the filter unit 16 is being used, the valve 21 in the pipe line 18 is open and the valve 21 in the pipe line 19 is closed. The egg material is thus directed into the filter 16 through the end cap 42 thereof and into the filter screen 52. The filter screen is a wire mesh screen of selected size containing from fourteen to twenty wires to the linear inch in each direction. Eighteen wires to the linear inch in each direction have been found highly effective to remove the undesirable ingredients and to disintegrate the chalazae and other disintegratable material in the eggs. The superatmospheric pressure produced by the gear pump 12 propels the egg material upwardly along the screen 52 and ejects the material through the screen to collect in the cylindrical casing 40. As the casing fills with egg material, the filtered material is discharged through the discharge conduit 24 into the mixing tank 25. It is thus evident that the egg material from the pump 12 is moved always against back pressure maintained by a head of egg material above the filter member. The egg material is thus always filtered against a fluid head of filtered egg material which is highly desirable in preventing foaming of the egg meats.

The gear pump serves to disintegrate partially the egg chalazae and the filter prevents the passage of undisintegrated or large sized chalaza shreds or pieces into the storage tank. The filter also withholds undesirable shell fragments, lumpy materials and the like, as is illustrated in Figure 5, wherein the reference numeral 52 indicates the filter screen having built up on the inside thereof a filter bed 70 of unfiltered egg material and having built up on the outside thereof a layer 71 of filtered egg material passed through the screen but held thereon by membraneous matter and the like retained by the screen. As shown in Figure 5, egg shell fragments 72, lumpy material such as meat balls 73, chalazae and undisintegrated membraneous matter 74, build up a filter bed on the screen which holds back the gelatinous slimy egg materials 75. On the other side of the filter gelatinous matter 76 which has passed through the filter is held against the outside surface of the filter by membraneous material 77 passed partly through the filter but withheld on the filter screen because of its undesirable size. When the filter bed such as is shown in Figure 5 is built up on the inside of the screen the same is clogged so that the pressure produced by the gear is not sufficient to force additional unfiltered material through the screen. This condition can be anticipated by the pressure gauge 15 which shows when the pressure within the filter is built up to an undesired degree. The filter 16 is then thrown out of operation and the filter 17 brought into operation by opening the valve 21 in the pipe line 19. The valve 21 in the pipe line 18 is then closed together with the valve 27 in the pipe line 22 and the valve 27 in the pipe line 23 is opened so that egg material from the gear pump will be directed through the filter 17 without interrupting the process. The filter 16 can then be removed from the system by uncoupling the unions between the pipes 19, 23 and the end caps of the filter. The removed filter is next disassembled by removing the top end cap therefrom and the filter screen 52 withdrawn for a thorough cleaning. The cleaned filter 16 is next reinserted in the system and is ready for use when the filter 17 becomes clogged. The clogged filter 17 is then removed and cleaned. Thus a continuous operation of the apparatus is insured.

The upward slope of the filter member provides for a building up of an elastic filter bed 70 over the entire inner periphery of the screen and the egg material passing into the screen flows parallel to the screen walls up to the closure plate 56 thereof where it is diverted and must again flow back along the screen walls until the same either passes through the screen or forms a bed on the inside walls of the screen. It should be understood that the maintenance of a back pressure of fluid head against the screen prevents a foaming of the egg meats. Since the filter area is many times the normal area of a stream of the egg material being fed to the filter, the apparatus has high capacity. By arranging the filter units in tandem as illustrated in Figure 2 the process is rendered continuous by merely throwing the clogged filter out of operation and bringing a cleaned filter into operation without stopping the gear pump.

It is desirable that the area of the filter screen be many times the cross sectional area of the supply conduit to the filter screen so that the egg material from the supply conduit is expanded into the filter screen.

I am aware that many changes may be made and numerous details of construction may be varied through a wide range without departing from the principles of this invention, and I, therefore, do not purpose limiting the patent granted hereon otherwise than necessitated by the prior art.

I claim:

1. The process of treating eggs for canning and the like which comprises forcing egg meats under superatmospheric pressure out of a conduit having a relatively small cross-sectional area into a filter having a large filtering surface with an area many times greater than the cross-sectional area of the conduit and maintaining a back pressure against the filter whereby the egg meats are disintegrated, freed from chalaza, shell fragments and foreign matter and foaming of the egg meats is prevented.

2. That process of filtering eggs to prepare the same for canning which comprises flowing egg material upwardly under superatmospheric pressure along a foraminous surface adapted to receive therethrough disintegrated egg meats, chalaza and the like but capable of withholding shell fragments, foreign materials, lumps, and undisintegrated chalaza and maintaining a head of filtered egg meats against said foraminous surface to prevent foaming of the egg material.

3. The process of treating eggs to prepare the same for canning which comprises mechanically disintegrating the egg meats out of contact with the atmosphere, simultaneously forcing the egg meats under a substantially constant superatmospheric pressure through a conduit of relatively small cross-sectional area, expanding the egg meats from said conduit upwardly along an inclined path through a foraminous screen having a large cross-sectional area and maintaining a hydrostatic head of filtered egg material against the screen to prevent foaming.

4. A continuous process for preparing egg meats for canning which comprises flowing egg meats through a conduit of relatively small cross-sectional area, maintaining superatmospheric pressure in said conduit, expanding the egg meats from said conduit upwardly through a foraminous filter adapted to withhold shell fragments, foreign material, lumps, and unbroken chalaza thereon, building up a head of filtered egg meats against the other side of the foraminous filter and diverting the stream of egg meats into a second filter when the first filter becomes clogged.

5. A continuous process for preparing egg meats for canning which comprises mechanically disintegrating the egg meats out of contact with the atmosphere, simultaneously compressing the egg meats under superatmospheric pressure, flowing the compressed egg meats along a conduit of relatively small cross-sectional area, expanding the compressed egg meats into a filter of large cross-sectional area, allowing a filter bed of shell fragments, lumps, unbroken chalaza and foreign material to build up on a filter bed, diverting the flow into a second filter when the filter bed is built up to a predetermined degree whereby the first filter can be cleaned without interrupting the process, and maintaining a back pressure against each of the filter beds when the same is in use.

6. The process of preparing eggs for canning which comprises flowing egg meats under superatmospheric pressure along a conduit, expanding the egg meats from the conduit upwardly through a foraminous filter of large cross-sectional area, allowing a bed of unfiltered egg material to build up on said filter, diverting the flow of egg material from said conduit through a second filter when the first filter becomes clogged and maintaining a back pressure against each of said filters when the same is in use.

7. A continuous process for filtering eggs which comprises providing parallel passages for egg material, interposing a foraminous screen in said passages for receiving unfiltered egg material therein, flowing egg material under superatmospheric pressure into less than all of said passages, diverting said flow into other of said passages thereby permitting cleaning of a clogged foraminous screen without interrupting the process and maintaining a back pressure against said screen when the same is in use.

8. A continuous process for preparing eggs for canning which comprises mechanically disintegrating unfiltered egg material, simultaneously compressing said material to pressures above atmospheric pressure while maintaining the material out of contact with the atmosphere, providing parallel paths for the compressed egg material, interposing foraminous filters in said parallel paths adapted to retain undesired egg ingredients thereon but permitting the passage of disintegrated egg material therethrough, diverting the flow of egg material from one path to the other path whenever a filter in the path becomes clogged and maintaining a head of egg material against each filter when the same is in use.

9. A continuous process of filtering egg material which comprises flowing broken egg material downwardly by gravity, mechanically disintegrating and compressing the broken egg material out of contact with the atmosphere, flowing the compressed egg material through a conduit of relatively small cross-sectional area, expanding the compressed egg material upwardly through a filter of relatively large cross-sectional area, allowing a back pressure to build up against said filter, discharging the filtered egg material upwardly from said filter and diverting the flow of compressed egg material into a second filter when the first used filter becomes clogged.

10. The process of filtering egg material which comprises impelling egg material by a pressure greater than atmospheric pressure through a foraminous barrier, forming cylindrical filter layers on opposite sides of the barrier with chalaza and foreign matter removed from said egg material, and maintaining a back pressure against said barrier.

FRANK B. LOMAX,
*Administrator for the Estate of William L. Lomax, Deceased.*